(12) United States Patent
Matsuki

(10) Patent No.: US 7,738,210 B2
(45) Date of Patent: *Jun. 15, 2010

(54) POSITION CONTROL METHOD OF INERTIAL DRIVE ACTUATOR AND INERTIAL DRIVE ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/114,358

(22) Filed: May 2, 2008

(65) Prior Publication Data

US 2008/0278840 A1 Nov. 13, 2008

(30) Foreign Application Priority Data

May 8, 2007 (JP) ............................. 2007-123305

(51) Int. Cl.
G11B 15/18 (2006.01)
(52) U.S. Cl. ......................................... 360/71; 359/824
(58) Field of Classification Search ................... 360/71; 359/824; 310/323.02, 309, 338, 311; 369/30.03
See application file for complete search history.

(56) References Cited

U.S. PATENT DOCUMENTS

2009/0015949 A1* 1/2009 Matsuki ...................... 359/824

FOREIGN PATENT DOCUMENTS

JP 08-066064 3/1996
JP 2006-171172 6/2006

* cited by examiner

Primary Examiner—Ali Neyzari
(74) Attorney, Agent, or Firm—Scully, Scott, Murphy & Presser, P.C.

(57) ABSTRACT

A position control method of inertial drive actuator includes a movement-amount setting step of setting an amount of movement, a target-position setting step of setting a target position of a moving body, a position detection step of detecting a relative position of the moving body, a comparison step of comparing the target position and the relative position, a drive-voltage pattern setting step of setting a drive voltage pattern which is to be applied to the moving means, a first electrode, and a second electrode, based on the amount of movement which is set, and a comparison result, and a driving step of driving the moving body by controlling a frictional force between the vibration substrate and the moving body, by making an electrostatic force act on both, while synchronizing with a movement of the vibration substrate, by applying a drive voltage pattern which is set at the drive-voltage pattern setting step, between the first electrode and the second electrode, and the moving body is moved to the target position by repeating steps from the comparison step to the driving step.

28 Claims, 13 Drawing Sheets

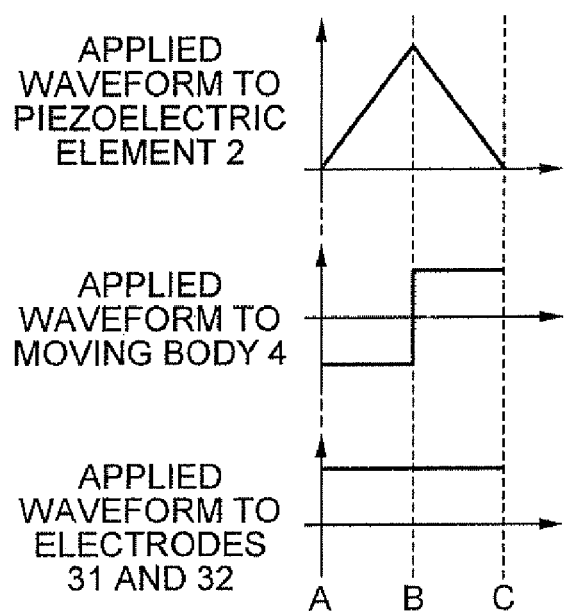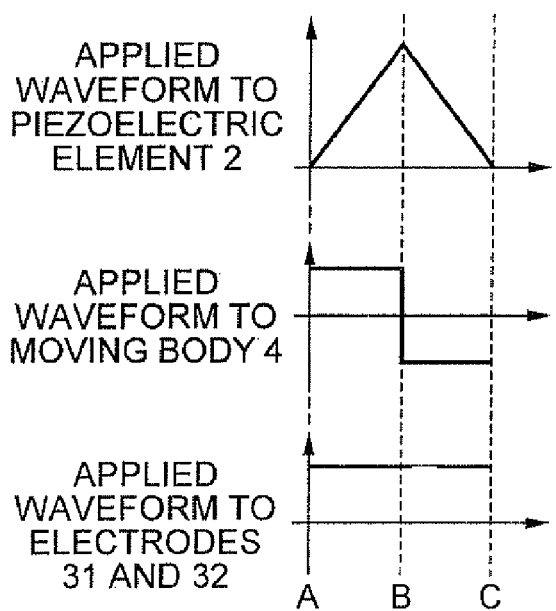

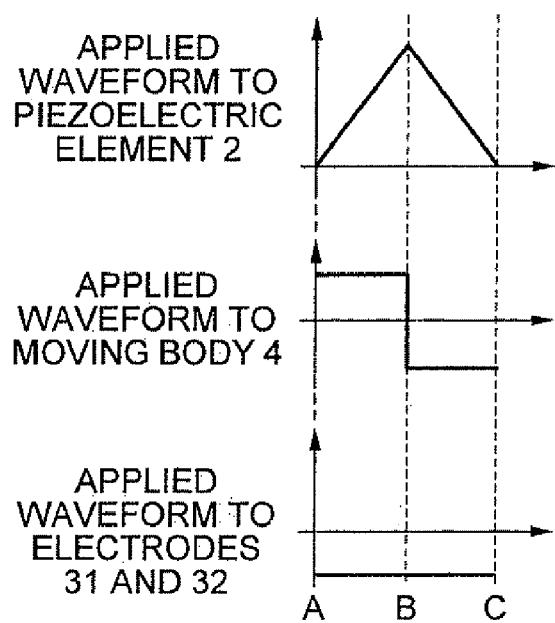
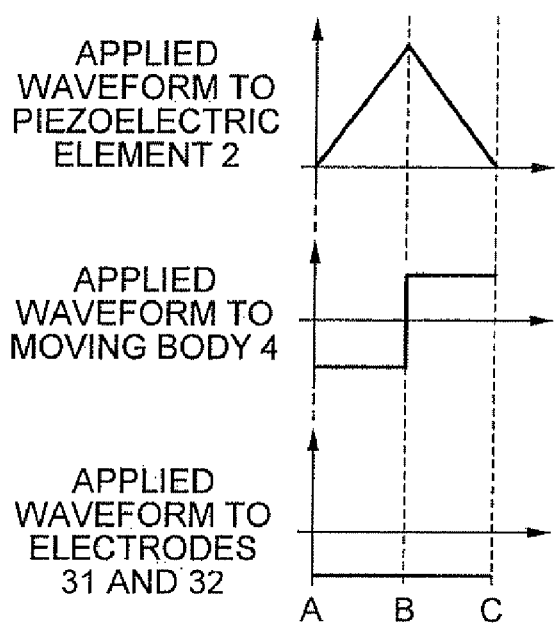
FIG. 5A
FIG. 5B

POSITION CONTROL METHOD OF INERTIAL DRIVE ACTUATOR AND INERTIAL DRIVE ACTUATOR

CROSS-REFERENCE TO RELATED APPLICATION

The present application is based upon and claims the benefit of priority from the prior Japanese Patent Application No. 2007-123305 filed on May 8, 2007; the entire content of which are incorporated herein by reference.

BACKGROUND OF THE INVENTION

1. Field of the Invention

The present invention relates to an inertial drive actuator which drives a moving body by inertia, with respect to a vibration substrate which is subjected to reciprocated drive by a moving means, and a position control method of the inertial drive actuator.

2. Description of the Related Art

When a drive pulse of a waveform formed of a gently rising part and a rapidly falling part is applied to an electromechanical transducer such as a piezoelectric element, at (in) the gently rising part of the drive pulse, the piezoelectric element is displaced by being extended gradually in a direction of thickness, and at the rapidly falling part, the piezoelectric element is displaced by being contracted rapidly. Given this, by using this characteristic, by applying a drive pulse of a waveform as mentioned above to the piezoelectric element, discharge and charge are repeated at different speeds, and vibrations are generated in a direction of thickness in the piezoelectric element, at different speeds in the piezoelectric element. By the vibrations generated, a driving member fixed to the piezoelectric element is let to make a reciprocating movement at different speeds, and a moving member (body) which is attached to the driving member is moved in a predetermined direction. An actuator carrying out the abovementioned function has been known. Moreover, a displacement amount detection method of detecting a position of the moving member of such actuator or a position of a lens holding frame which is attached to the moving member of such actuator has been disclosed in Japanese Patent Application Laid-open Publication No. 2006-171172.

A conventional position detection method and a positioning method will be described below by referring to FIG. 13. Here, FIG. 13 is a cross-sectional view showing a schematic structure of a lens unit according to the conventional displacement detection method. In this lens unit, a holding frame 218 which holds a lens 216 is fixed to one end of an outer cylinder 214, and a lens 220 is held by a reduced-diameter portion 214B formed at the other end. A lens holding frame 226 which holds a lens 228 is attached to a drive shaft 222 connected to a piezoelectric element 230. The lens holding frame 226 is guided in an optical axis O direction by a guide shaft 224. A magnetic pole 238 of N polarity or S polarity is polarized at a fixed interval alternately along a longitudinal direction of the drive shaft 222. Whereas, a magnetic resistive element 236 is fixed to the holding frame 226, and an MR sensor 234 is formed by the magnetic pole 238 and the magnetic resistive element 236. When the magnetic resistive element 236 is displaced along the drive shaft 222 due to a displacement of the holding frame 226, since the magnetic resistive element 236 intersects the leakage magnetic flux of the magnetic pole 238, a value of resistance of the magnetic resistive element 236 changes periodically, and generates a predetermined position detection pulse. By counting the number of these position detection pulses, it is possible to find an amount of displacement of the holding frame 226 and the lens 228 in a direction of arrow A and a direction of arrow B. Moreover, in the outer cylinder 214, a home position sensor 240 is fixed at a position corresponding to a home position of the holding frame 226.

By using this apparatus, firstly, a position detection at a rough position is carried out. Concretely, a predetermined drive pulse is applied to the piezoelectric element 230, and the amount of displacement of the holding frame 226 is obtained by a position detection pulse from the MR sensor 234. The amount of displacement which is obtained is divided by the number of drive pulses required for this displacement, and the amount of displacement of the holding frame 226 per drive pulse is obtained. Based on the amount of displacement per drive pulse which is obtained, the number of drive pulses corresponding to the desired amount of displacement of the holding frame 226, are applied to the piezoelectric element 230, and the holding member 226 is positioned. Concretely, for instance, the holding frame 226 is moved once to the home position, and with this as a reference, the predetermined number of drive pulses are applied to the piezoelectric element 230, and the holding frame is made to be displaced to the desired position.

However, since a frictional force due to the attachment of the drive shaft 222 and the lens holding frame 226 is not constant in a movement stroke, there is a problem that the amount of movement of the lens holding frame 226 (moving body) per drive differs for each pulse. Consequently, only by applying the number of pulses based on the amount of movement per one drive which is calculated, an error between the amount of movement per drive which is calculated and the actual amount of movement per drive piles up, and it is not possible to carry out accurate positioning finally.

SUMMARY OF THE INVENTION

The present invention is made in view of the abovementioned circumstances, and an object of the present invention is to provide a position control method of an inertial drive actuator which is capable of arranging a moving body at a target position accurately and promptly, and an inertial drive actuator in which this position control method is used.

To solve the abovementioned issues and to achieve the objective, there is provided a position control method of inertial drive actuator which is a method of driving a moving body by inertia, with respect to a vibration substrate which is caused to make reciprocating movement by a moving means, including a movement-amount setting step of setting an amount of movement per driving waveform, a target-position setting step of setting a target position of the moving body, a position detection step of detecting a relative position of the moving body with respect to the vibration substrate, based on an electrostatic capacitance of a portion at which, a first electrode provided on the moving body and a second electrode provided on the vibration plate are facing, a comparison step of comparing the target position which is set at the target-position setting step and the relative position of the moving body with respect to the vibration substrate, which is detected at the position detection step, a drive-voltage pattern setting step of setting a drive voltage pattern which is to be applied to the moving means, the first electrode, and the second electrode, based on the amount of movement set at the movement-amount setting step and a comparison result at the comparison step, and a driving step of driving the moving body by controlling a frictional force between the vibration substrate and the moving body, by making an electrostatic force act on both, while synchronizing with a movement of the vibration substrate, by applying a drive voltage pattern which is set at the drive-voltage pattern setting step, between the first electrode and the second electrode, and the moving body is moved to the target position by repeating steps from the comparison step to the driving step.

In the position control method of inertial drive actuator according to the present invention, it is preferable that the amount of movement per driving waveform is set from a predetermined number of drive voltage patterns applied to the moving means, and the first electrode and the second electrode from a predetermined position of the moving body, and an amount of movement from a predetermined position after the moving body is moved.

In the position control method of inertial drive actuator according to the present invention, data of the amount of movement per driving waveform of the moving body, which is measured at a time of simulation and assembling may be set.

In the position control method of inertial drive actuator according to the present invention, it is desirable that the amount of movement per driving waveform is set for two directions namely, a predetermined direction of movement of the moving body, and a direction opposite to the predetermined direction of movement of the moving body.

In the position control method of inertial drive actuator according to the present invention, it is possible to set once again the amount of movement per driving waveform based on a relationship between a drive voltage pattern which is output at the driving step and a position which is detected by the position detection, when the process is shifted from the driving step to the position detection step.

In the position control method of inertial drive actuator according to the present invention, it is preferable that after an end of the driving step, once again, at the time of setting the drive voltage pattern, a voltage value of the drive voltage pattern to be applied is changed based on a result at the position detection step and the comparison step.

In the position control method of inertial drive actuator according to the present invention, it is preferable that the moving body is made of an electroconductive material, and the moving body functions as the first electrode.

A position control method of inertial drive actuator which is a method of driving a first moving body and a second moving body by inertia, with respect to a vibration substrate which is caused to make reciprocating movement by a moving means, includes a movement-amount setting step of setting an amount of movement per driving waveform, a target-position setting step of setting a first target position and a second target position of the first moving body and the second moving body, a position detection step of detecting relative positions of the first moving body and the second moving body with respect to the vibration substrate, based on an electrostatic capacitance of a portion at which, a first electrode and a third electrode provided on the first moving body and the second moving body, and a second electrode provided on the vibration substrate are facing, a comparison step of comparing the target position which is set at the target-position setting step and the relative positions of the first moving body and the second moving body with respect to the vibration substrate, which are detected at the position detection step, a drive-voltage pattern setting step of setting a drive voltage pattern which is to be applied to the moving means, the first electrode, and the second electrode, based on the amount of movement set at the movement-amount setting step and a comparison result at the comparison step, and a driving step of driving the moving body by controlling a frictional force which is developed between the vibration substrate, and the first moving body and the second moving body, by making an electrostatic force act on both, while synchronizing with a movement of the vibration substrate, by applying a drive voltage pattern which is set at the drive-voltage pattern setting step between the first electrode and the second electrode, and the third electrode, and the first moving body and the second moving body are moved to the target position by repeating steps from the comparison step to the driving step.

In the position control method of inertial drive actuator according to the present invention, it is preferable that the target position which is set at the target-position setting step is set by relative positions of the first moving body and the second moving body, and the vibration substrate.

In the position control method of inertial drive actuator according to the present invention, the target position which is set at the target-position setting step may be set by letting a distance between the first moving body and the second moving body as the target position.

In the position control method of inertial drive actuator according to the present invention, it is desirable that the amount of movement per driving waveform of the moving body is set for each of the first moving body and the second moving body.

In the position control method of inertial drive actuator according to the present invention, it is preferable that the amount of movement per driving waveform is set for two directions namely, a predetermined direction of movement of the moving body, and a direction opposite to the predetermined direction of movement of the moving body.

In the position control method of inertial drive actuator according to the present invention, the amount of movement per driving waveform to be set for the first moving body and the second moving body may be set for two directions namely, a predetermined direction of movement of the moving body, and a direction opposite to the predetermined direction of the movement of the moving body.

In the position control method of inertial drive actuator according to the present invention, it is preferable that the first moving body and the second moving body are made of an electroconductive material, and the first moving body and the second moving body function as the first electrode and the second electrode respectively.

An inertial drive actuator according to the present invention, which drives a moving body by inertia, with respect to a vibration substrate, which is caused to make a reciprocating movement by a moving means, includes a movement-amount storage means, which stores an amount of movement per driving waveform, a target-position storage means, which stores a target position of the moving body, a position detecting means, which detects a relative position of the moving body with respect to the vibration substrate, based on an electrostatic capacitance of a portion at which, a first electrode provided on the moving body and a second electrode provided on the vibration substrate are facing, a comparing means, which compares the target position stored in the target-position storing means, and a relative position of the moving body with respect to the vibration substrate, which is detected by the position detecting means, a drive-voltage pattern setting means, which sets a drive voltage pattern which is to be applied to the moving means, the first electrode, and the second electrode, based on the amount of movement stored in the movement-amount storage means, and an output of a comparison result, and a driving means, which drives the moving body by controlling a frictional force between the vibration substrate and the moving body, by making an electrostatic force act on both, while synchronizing with a movement of the vibration substrate, by applying a drive voltage pattern which is set at (by) the drive-voltage pattern setting means, between the first electrode and the second electrode.

In the inertial drive actuator according to the present invention, it is preferable that the amount of movement stored in the movement-amount storage means is an amount of movement which is set from a predetermined number of drive voltage patterns applied to the moving means, and the first electrode and the second electrode from a predetermined position after the moving body is moved.

In the inertial drive actuator according to the present invention, it is desirable that data of the amount of movement per driving waveform of the moving body, which is measured at a time of simulation and assembling is set.

In the inertial drive actuator according to the present invention, the amount of movement per driving waveform stored in the movement-amount storage means may be set for two directions namely, a predetermined direction of movement of the moving body, and a direction opposite to the predetermined direction of movement of the moving body.

In the inertial drive actuator according to the present invention, the moving body may be made of an electroconductive material and the moving body may function as the first electrode.

The inertial drive actuator according to the present invention which drives a first moving body and a second moving body by inertia, with respect to a vibration substrate which is caused to make reciprocating movement by a moving means, includes a movement-amount storage means which stores an amount of movement per driving waveform, a target-position storage means which stores a target position of the first moving body and the second moving body, a position detecting means which detects relative positions of the first moving body and the second moving body with respect to the vibration substrate, based on an electrostatic capacitance of a portion where, a first electrode and a third electrode provided on the first moving body and the second moving body, and a second electrode provided on the vibration substrate are facing, a comparing means which compares the target position stored in the target-position storage means and relative positions of the first moving body and the second moving body detected by the position detecting means, a drive-voltage pattern setting means which sets a drive voltage pattern which is to be applied to the moving means, the first electrode, and the second electrode, based on the amount of movement stored in the movement-amount storage means, and an output of the comparing means, and a driving means which drives the moving body by controlling a frictional force between the vibration substrate and the moving body, by making a force act on both while synchronizing with a movement of the vibration substrate, by applying a drive voltage pattern which is set at the drive-voltage pattern setting means, between the first electrode and the second electrode, and the third electrode.

In the inertial drive actuator according to the present invention, it is preferable that the target positions stored in the target-position storage means are relative positions of the first moving body and the second moving body, and the vibration substrate.

In the inertial drive actuator according to the present invention, it is desirable that the target position stored in the target-position storage means is set as a distance between the first moving body and the second moving body.

In the inertial drive actuator according to the present invention, it is preferable that the amount of movement per driving waveform of the moving body is set for each of the first moving body and the second moving body.

In the inertial drive actuator according to the present invention, the amount of movement per driving waveform may be set for two directions namely, a predetermined direction of movement of the moving body, and a direction opposite to the predetermined direction of movement of the moving body.

In the inertial drive actuator according to the present invention, it is preferable that the amount of movement per driving waveform to be set for the first moving body and the second moving body is set for two directions namely, a predetermined direction of movement of the moving body, and a direction opposite to the predetermined direction of movement of the moving body.

In the inertial drive actuator according to the present invention, it is preferable that the first moving body and the second moving body are made of an electroconductive material, and the first moving body and the second moving body function as the first electrode and the third electrode respectively.

In the inertial drive actuator according to the present invention, the amount of movement stored in the movement-amount storage means may be an amount of movement which is set from a predetermined number of drive voltage patterns applied to the moving means, and the first electrode, the second electrode, and the third electrode from a predetermined position after the moving body is moved.

In the inertial drive actuator according to the present invention, it is preferable that the data of the amount of movement per driving waveform of the moving body, which is measured at a time of simulation and assembling, is set.

BRIEF DESCRIPTION OF THE DRAWINGS

FIG. 3A and FIG. 3B show a driving waveform per drive when a moving body of the inertial drive actuator according to the first embodiment is moved in a left direction and a right direction respectively, with a horizontal axis showing time and a vertical axis showing size of a signal;

FIG. 5A and FIG. 5B show a driving waveform per drive when a moving body in a modified embodiment of the first embodiment is moved in the left direction and the right direction respectively, with a horizontal axis showing time and a vertical axis showing a size of a signal;

DETAILED DESCRIPTION OF THE PREFERRED EMBODIMENTS

Exemplary embodiments of an inertial drive actuator according to the present invention will be described below in detail by referring to the accompanying diagrams. However, the present invention is not restricted to these embodiments.

First Embodiment

Figure 1:
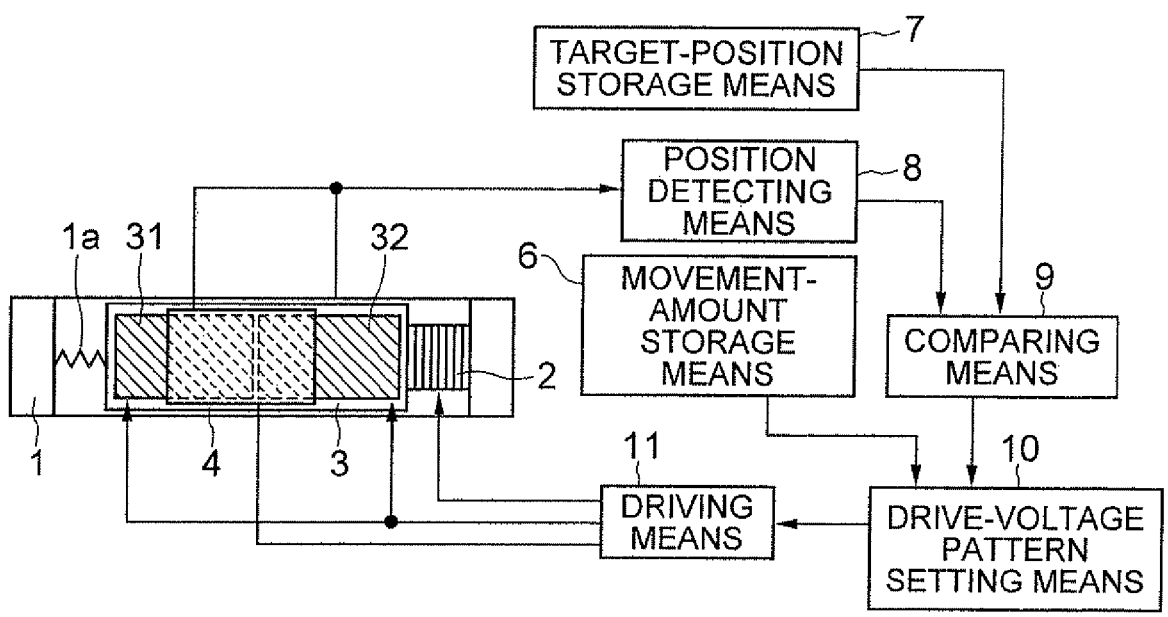
FIG. 1 is a partial plan view showing a structure of an inertial drive actuator according to a first embodiment.
Figure 2:
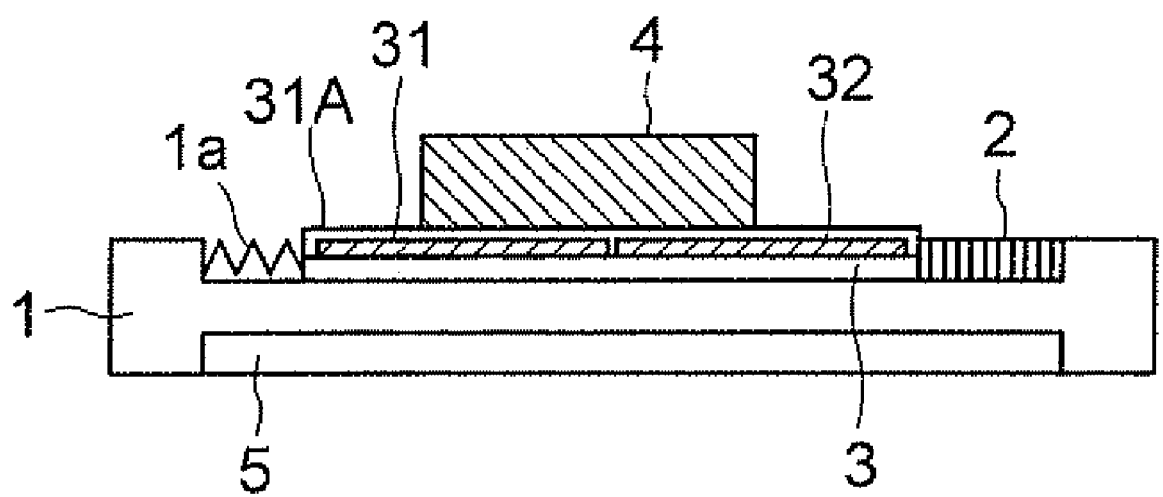
FIG. 2 is a side view (cross-sectional view) showing the structure of the inertial drive actuator according to the first embodiment of the present invention.

FIG. 1 is a diagram showing a structure of an inertial drive actuator which is controlled by a first embodiment of the present invention. Moreover, FIG. 2 shows a side-surface (cross-sectional) view thereof.

In the inertial drive actuator according to the first embodiment, one end of a piezoelectric element (moving means) 2 is fixed to a fix member 1, and one end of a vibration substrate 3 is fixed to the other end thereof. One end of a spring 1a is fixed to the other end of the vibration substrate 3, and the other end of the spring 1a is fixed to a side wall of the fix member 1. Accordingly, with a minute displacement of the piezoelectric element 2, the vibration substrate 3 is displaced minutely, resisting an elastic force of the spring 1a. In other words, by applying a drive voltage to the piezoelectric element 2, the spring 1a is contracted resisting the elastic force, and by stopping applying the voltage, the spring 1a regains an initial state, and the vibration substrate 3 returns to an initial position.

An electrode 31 and an electrode 32 are formed on the vibration substrate 3, and a moving body 4 is disposed on the vibration substrate 3 via an insulating film 31A. When an electric potential difference is developed between the moving body 4 (the moving body is let to be an electroconductive body) and the electrodes 31 and 32, when these are assumed to be electrodes facing these, an electrostatic force acts between these electrodes. On a side of the vibration substrate 3, opposite to a side where the moving body 4 is disposed, a permanent magnet 5 is disposed to be extended in a direction of vibration of the vibration substrate 3. A magnetic material is used in the moving body 4, and a magnetic adsorption force acts between the permanent magnet 5 and the moving body 4. Therefore, when a voltage applied between the moving body 4 and the electrodes 31 and 32 is stopped, the moving body 4 is held up at that position due to the permanent magnet 5. The moving body 4 corresponds to a first electrode. The electrodes 31 and 32 correspond to the second electrode.

A position detecting means 8 is connected to the electrode 31 and the electrode 32. The position detecting means 8 detects an electrostatic capacitance between the moving body 4 and the electrode 31, which are facing mutually, and an electrostatic capacitance between the moving body 4 and the electrode 32 which are facing mutually. This detection data is transmitted to a comparing means 9 (such as a comparing circuit). A target-position storage means 7 (memory such as RAM (Random Access Memory)) is connected to the comparing means 9. The comparing means 9 compares the data transmitted, and data, which is sent from the position detecting means 8. A result of comparison is output to a drive-voltage pattern setting means 10 (such as a drive-voltage pattern setting circuit). The driving-voltage pattern setting means 10 (such as a driving-voltage pattern setting circuit) is connected to a movement amount storage means 6. An amount of movement of the vibration substrate 3 when one driving waveform is applied to the piezoelectric element 2 is stored in the movement-amount storage means 6. In the drive-voltage pattern setting means 10, a drive signal corresponding to the amount of movement stored in the movement-amount storage means 6 (such as a driving circuit) and the comparison result in the comparing means 9 are output to the driving means 11. The driving means 11 is connected to the piezoelectric element 2, the electrode 31, the electrode 32, and the moving body 4, and imparts an independent drive signal to the piezoelectric element 2, the electrode 31, the electrode 32, and the moving body 4.

A driving waveform per drive of the inertial drive actuator according to the first embodiment is shown FIG. 3A and FIG. 3B. FIG. 3A is a waveform which moves the moving body 4 to left (direction in which the spring 1a contracts), and FIG. 3B is a waveform which moves the moving body 4 to right (direction in which, the contracted spring 1a returns to the original length, or the direction of extension of the spring 1a). Here, a driving principal will be described citing an example of FIG. 3A. A case in FIG. 3B being similar, the detail description thereof is omitted.

In an interval from A to B shown in FIG. 3A, an applied waveform to the piezoelectric element 2 rises steeply (upper figure), and accordingly, together with a rapid displacement of the piezoelectric element 2 to left, the vibration substrate 3 also moves rapidly to left. On the other hand, in the interval from A to B, an applied voltage (middle figure) to the moving body 4 and an applied voltage (lower figure) to the electrodes 31 and 32 are such that the potential difference is developed mutually. Therefore, an electrostatic adsorption force is generated between the moving body 4 and the electrodes 31 and 32, and accordingly, a frictional force between the vibration substrate 3 and the moving body 4 is increased. Consequently, the moving body 4 also moves to left along with the displacement of the vibration substrate 3.

Next, in an interval from B to C in FIG. 3A, conversely, the applied waveform to the piezoelectric element 2 falls rapidly (upper figure), and accordingly, the piezoelectric element 2 contracts rapidly, and the vibration substrate 3 moves rapidly to right. On the other hand, in the interval from B to C, an applied voltage (lower figure) to the moving body 4 and an applied voltage (lower figure) to the electrodes 31 and 32 are same. Therefore, the electrostatic adsorption force is not generated between the moving body 4, and the electrodes 31 and 32, and the frictional force between the vibration substrate 3 and the moving body 4 is decreased. Consequently, by an inertia of the moving body 4, the frictional force between the moving body 4 and the vibration substrate 3 is overcome, and remains at that position. By repeating a waveform from A to C, the moving body 4 moves toward left with respect to the vibration substrate 3.

Whereas, for moving the moving body 4 to right, as shown in FIG. 3B, the applied voltage to the electrodes 31 and 32 and the applied voltage to the moving body 4 at the time of raising steeply the applied waveform to the piezoelectric element 2 are let to be same, and a voltage to be applied to the moving body 4, and the electrodes 31 and 32 at the time of making fall steeply the applied waveform to the piezoelectric element 2 is let to be such that an electric potential difference is developed between the moving body 4 and the electrodes 31 and 32. The basic driving principal of the actuator is as described above.

Figure 4:
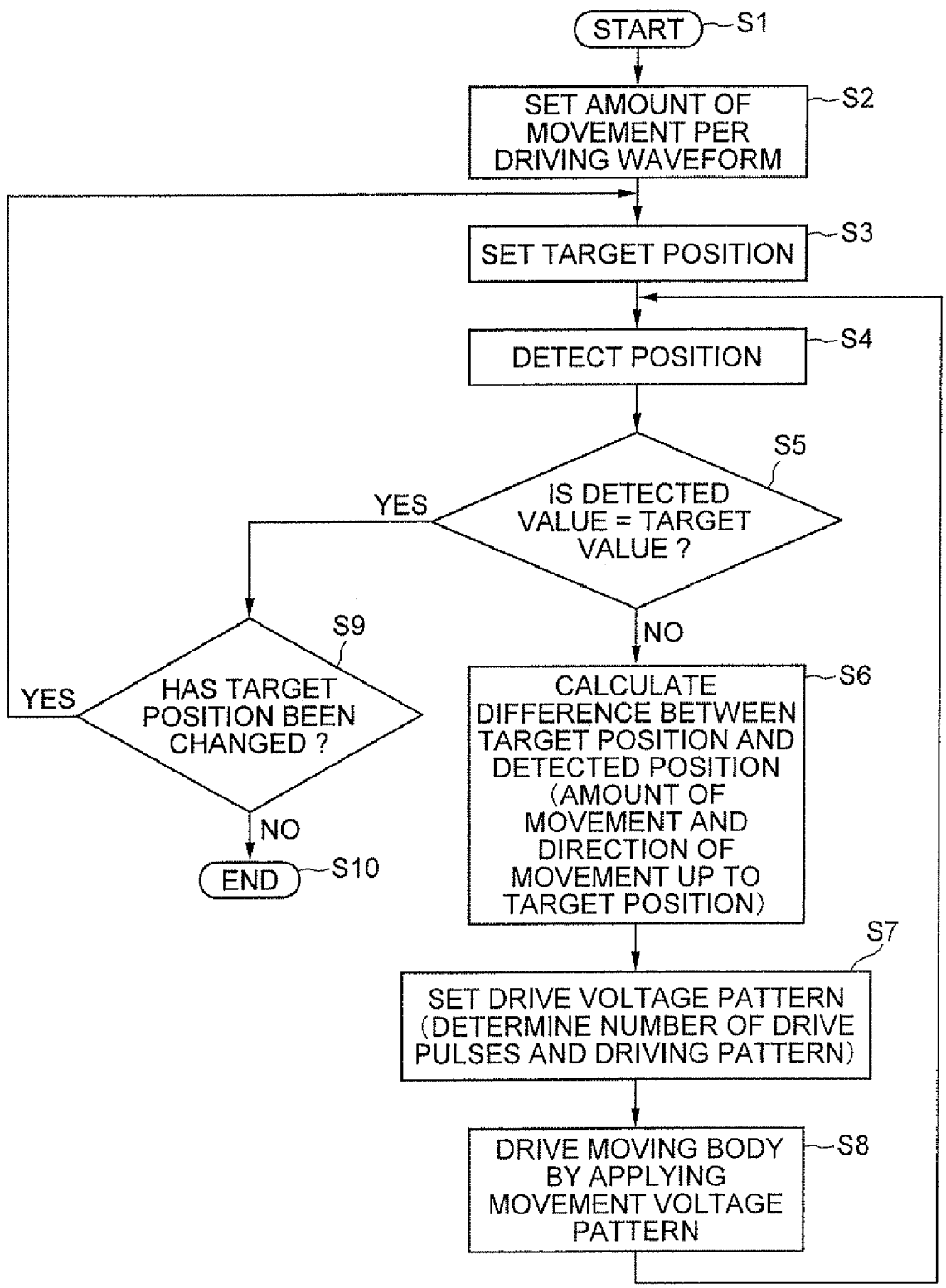
FIG. 4 is a flowchart showing a flow of a position control of the inertial drive actuator according to the first embodiment.

FIG. 4 shows a position control flow of the first embodiment.

When the control is started (step S1), firstly, an amount of movement per driving waveform of the vibration substrate 3 in the inertial drive actuator is set from outside, or is set by calibration (step S2). The amount of movement which is set is stored in the movement-amount storage means 6. Next, a target position is set by an external device (not shown in the diagram) such as a PC (personal computer), and is stored in the target-position storage means 7 (step S3).

Next, the current position of the moving body 4 is detected by positional relationship of the moving body 4 and the electrodes 31 and 32 (step S4). In the first embodiment, detection of electrostatic capacitance is used for the position detection. An electrostatic capacitance obtained from a condenser which is formed by facing of the moving body 4 and the electrode 31, and an electrostatic capacitance obtained from a condenser which is formed by facing of the moving body 4 and the electrode 32 are fetched to the position detecting means 8. The position of the moving body 4 is calculated from a ratio of the electrostatic capacitance and a difference between the electrostatic capacitance. The electrostatic capacitance is proportional to a size of a facing area of electrodes which form the condenser. Therefore, when the facing area of the moving body 4 and the electrode 31 and the facing area of the moving body 4 and the electrode 32 change due to the movement of the moving body 4, the electrostatic capacitance of these condensers changes according to the facing area. In the first embodiment, by using the ratio and the difference of the electrostatic capacitance changing in such manner, it is possible to calculate the position of the moving body 4.

The target position and the detected position are input to the comparing means 9 from the target-position storage means 7 and the position detecting means 8 respectively. When the difference between the target position and the detected position is not zero (NO at step S5), the difference between the target position and the detected position at the current point of time, in other words, an amount of movement up to the target position and a direction thereof are calculated (step S6).

When the direction and the amount of movement up to the target position are calculated, in the drive-voltage pattern setting means 10, the number of driving waveforms up to the target position is calculated from the amount of movement up to the target position and the amount of movement per driving waveform which is set in the movement-amount storage means 6, and the drive-voltage pattern corresponding to the direction of movement is set (step S7).

The drive voltage pattern which is set is applied to each of the piezoelectric element 2, the moving body 4, and the electrodes 31 and 32 by the driving means 11. Based on the waveform which is applied, the moving body 4 moves to the target position (step S8). After applying the pattern, the position detection of the moving body 4 is carried out once again.

If the moving body 4 has reached the target position at this point of time, the control is terminated, and the subsequent target position command is awaited or the operation is terminated.

Since the frictional force between the vibration substrate 3 and the moving body 4, as it has been described earlier, differs according to the position of the moving body 4 within a movement stroke, it is not restricted that the target position is necessarily assumed after the driving waveform is input. Therefore, as to whether the moving body has actually reached the target position or not is confirmed (step S5) by carrying out once again the position detection of the moving body 4 (step S4) after the end of applying the driving waveform. Here, when the moving body 4 has not reached the target position (NO at step S5), from the target position and the detected position, the subsequent amount of movement and the number of driving waveforms are calculated once again, and the driving waveform is applied (steps S6 to S8), and the position detection of the moving body 4 is carried out once again (step S4).

By carrying out such process till the target position is assumed (YES at step S5), even when there is an error in the amount of movement per driving waveform due to a change in the frictional force between the vibration substrate 3 and the moving body 4 in the movement stroke, an accuracy of positioning of the moving body 4 is improved by correcting that (error) after applying the driving waveform. Moreover, instead of detecting the position for each drive pulse, the number of drive pulses necessary is set from the amount of movement up to the target position, and the position is detected after applying the drive voltage pattern for the number of drive pulses set. Therefore, it is possible to improve a positioning response time of the moving body 4.

A prerequisite for the judgment of whether it (the moving body 4) has reached the target position is that the detected position and the target position coincide. However, without restricting to this, the positioning may be terminated when the difference between the target position and the detected position is within a range of the amount of movement per driving waveform, or a tolerance for the target position may be set, and the positioning may be terminated when the difference between the target position and the detected position is within the tolerance.

When (the moving body 4) has reached the target position (YES at step S5), when there is no change in the target position (NO at step S9), the positioning is terminated (step S10). When there is a change in the target position (YES at step S9), an operation after the position detection described above (step S4) is carried out after the target position is set again (step S3).

The amount of movement per driving waveform may be calculated from an amount of movement when a predetermined number of driving waveforms is applied within the movement stroke on the vibration substrate 3 of the moving body 4 when the actuator power is put on, and may be let to be read by the movement-amount storage means 6, or the amount of movement per driving waveform which is obtained in advance at the time of simulation and assembling may be let to be read by the movement-amount storage means 6.

Moreover, a waveform which moves the moving body to right and left is not restricted to (the waveforms in) FIG. 3A and FIG. 3B. For example, as in modified examples shown in FIG. 5A and FIG. 5B, in a case of moving the moving body 4 to left, if the potential difference acts to generate an electrostatic adsorption force when the piezoelectric element 2 is extended (elongated), a polarity of the voltage applied to the moving body 4 and the electrodes 31 and 32 is immaterial.

Second Embodiment

Figure 6:
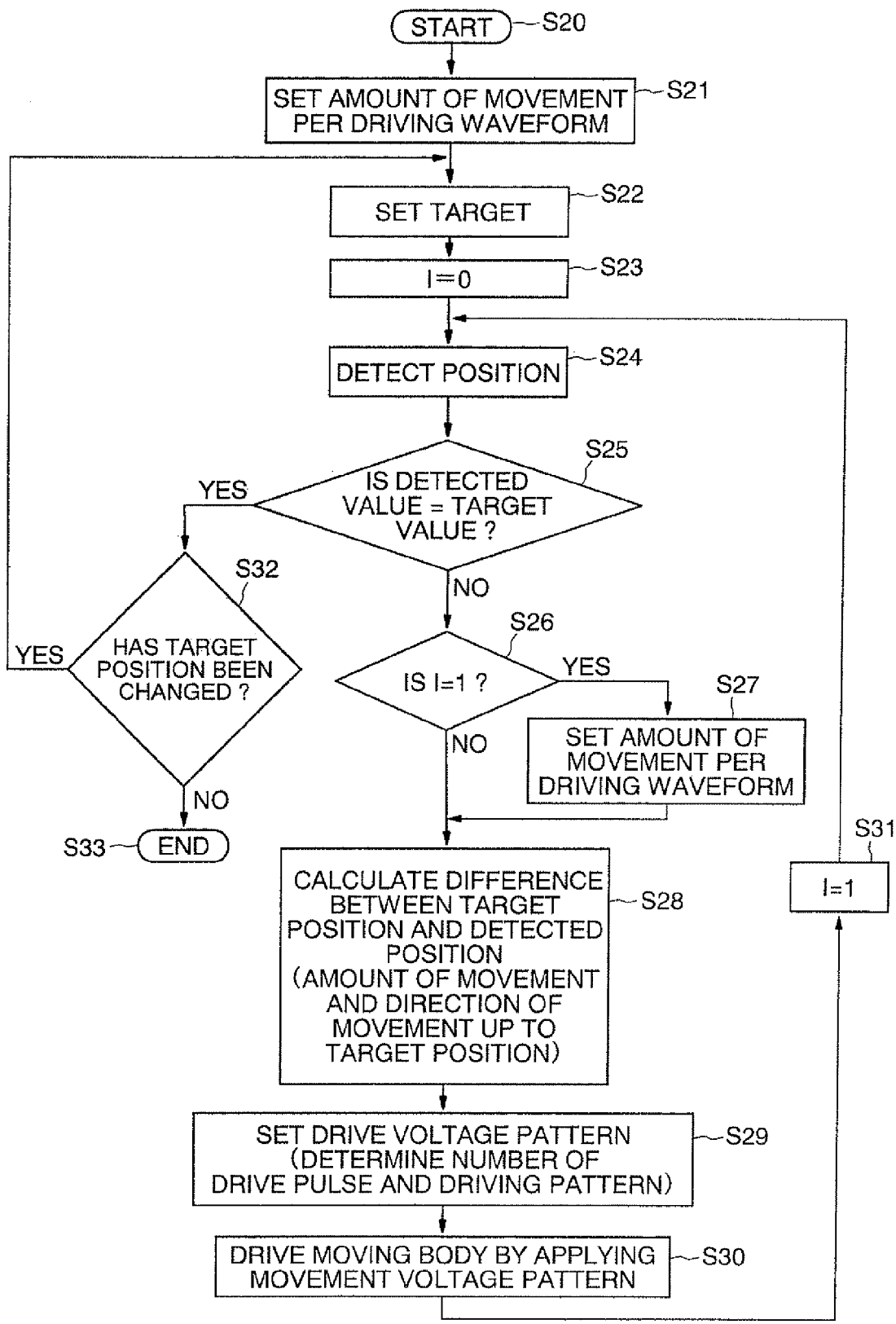
FIG. 6 is a flowchart showing a flow of a position control of an inertial drive actuator according to a second embodiment.

FIG. 6 shows a flowchart of a flow of a control in a second embodiment. The second embodiment is an embodiment in which, in an inertial drive actuator having a structure same as in the first embodiment, an amount of movement per driving waveform which is set before setting the target position is changed according to the situation, and the control is carried out by using flag I. After setting the target position (step S22), I is set to 0 (I=0) (step S23), and when the drive voltage pattern is applied (step S30), I is let to be 1 (I=1) (step S31). The flow of the control will be described below in detail.

When the control is started (step S20), firstly, an amount of movement per driving waveform of the vibration substrate 3 in the inertial drive actuator is set from outside, or is set by calibration (step S21), and the amount of movement which is set is stored in the movement-amount storage means 6. Next, the target position is set by an external device such as a PC (not shown in the diagram), and is stored in the target-position storage means 7 (step S22) Next, flag I is let to be zero (I=0) (step S23). Next, the current position of the moving body 4 is detected from a positional relationship of the moving body 4, and the electrodes 31 and 32 (step S24). Even in the second embodiment, detection of the electrostatic capacitance is used for the position detection. The position detection being similar to the position detection in the first embodiment, detail description thereof is omitted.

The target position and the detected position are input to the comparing means 9 from the target-position storage means 7 and the position detecting means 8 respectively, and when the difference between the target position and the detected position is not zero (NO at step S25), a judgment of whether flag I is 1 or not is made (step S26). When flag I is not 1 (NO at step S26), a difference in the target position and the detected position at the current point of time, in other words, the amount of movement up to the target position, and the direction thereof are calculated (step S28).

Next, in the drive-voltage pattern setting means 10, from the amount of movement up to the target position and the amount of movement per driving waveform which is set in the movement-amount storage means 6, the number of driving waveforms up to the target position is calculated, and also the drive voltage pattern corresponding to the direction of movement is set (step S29). The drive voltage pattern which is set is applied to each of the piezoelectric element 2, the moving body 4, and the electrodes 31 and 32 by the driving means 11, and based on the waveform which is applied, the moving body 4 is moved to the target position (step S30). Upon applying the waveform, after flag I is let to be 1 (step S31), the position detection of the moving body 4 is carried out once again (step S24).

As it has been described above, at the first control step, the drive voltage pattern is applied (step S30) based on the amount of movement per driving waveform which is determined in advance. In the position detection (step S24) after applying the drive voltage pattern, when it has not reached the target position (NO at step S25), it means that there is an error in calculation of the amount of movement per driving waveform. Therefore, in the subsequent control for which I=1 (YES at step S26), the amount of movement per driving waveform is set once again (step S27). Data to be used at this time can be set from the amount of movement of the moving body 4 and the drive voltage pattern which has been used for the control before (for the previous control). In this manner, by updating the amount of movement per driving waveform according to the situation, it is possible to improve further the accuracy of positioning and the response time to the target position. As a result of the control described above, when it has reached the target position (YES at step S25), if there is no change in the target position (NO at step S32), the positioning is terminated (step S33). When there is a change in the target position (YES at step S32), after the target position is set once again (step S22), the operation after the position detection described above (step S23) is carried out.

Third Embodiment

Figure 7:
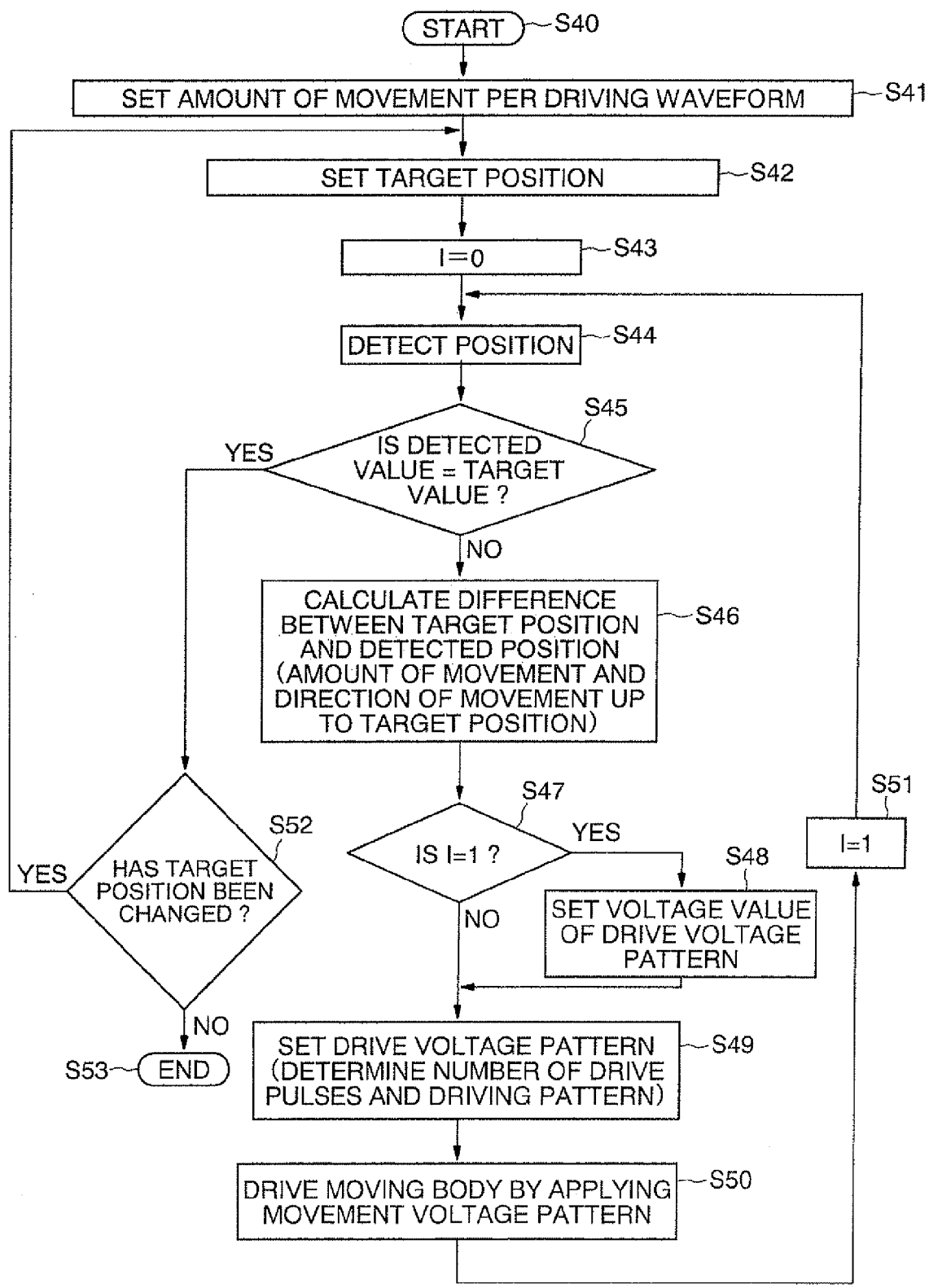
FIG. 7 is a flowchart showing a flow of a position control of an inertial drive actuator according to a third embodiment.

FIG. 7 is a flowchart showing a flow of control in a third embodiment. Here, in an inertial drive actuator having a structure same as in the first embodiment and the second embodiment, when the moving body 4 does not reach the target position by the first control, the amount of movement per driving waveform is not changed but, a voltage value of the drive voltage pattern is determined based on a difference between the target position and the amount of movement of the moving body 4. The amount of movement per driving waveform changes according to the voltage applied to the piezoelectric element 2, or a voltage which determines the frictional force on the moving body 4 and the vibration substrate 3. Therefore, changing the voltage value of the drive voltage pattern is consequentially same as changing the amount of movement per driving waveform according to the situation. Consequently, similarly as in the second embodiment, it is possible to improve further the accuracy of positioning and the response time to the target position. The flow of control will be described below in detail.

When the control is started (step S40), firstly, the amount of movement per driving waveform of the vibration substrate 3 in the inertial drive actuator is set from outside or is set by calibration (step S41), and the amount of movement which is set is stored in the movement-amount storage means 6. Next, the target position is set by an external device such as a PC (not shown in the diagram), and is stored in the target-position storage means 7 (step S42). Further, flag I is let to be 0 (zero) (step S43). Next, the current position of the moving body 4 is detected by the positional relationship of the moving body 4, and the electrodes 31 and 32 (step S44). Even in the third embodiment, the detection of the electrostatic capacitance is used for the position detection, and the position detection being same as in the first embodiment, the detail description thereof is omitted.

The target position and the detected position are input to the comparing means 9 from the target-position storage means 7 and the position detecting means 8 respectively, and when the difference between the target position and the detected position is not zero (NO at step S45), the difference between the target position and the detected position at the current point of time, in other words, the amount of movement up to the target position and the direction thereof are calculated (step S46).

Next, a judgment of whether flag I is 1 or not is made (step S47). When flag I is not 1 (NO at step S47), in the drive-voltage pattern setting means 10, from the amount of movement up to the target position, and the amount of movement per driving waveform which is set in the movement-amount storage means 6, the number of driving waveforms up to the target position are calculated, and also, the drive voltage pattern corresponding to the direction of movement is set (step S49). The drive voltage pattern which is set is applied to the piezoelectric element 2, the moving body 4, and the electrodes 31 and 32, by the driving means 11. Based on the waveform applied, the moving body 4 moves to the target position (step S50). Upon applying the waveform, after flag I is let to be 1 (step S51), the position detection of the moving body 4 is carried out once again (step S44).

As it has been described above, at the first control step, the drive voltage pattern is applied (step S50) based on the amount of movement per driving waveform which is determined in advance. In the position detection (step S44) after applying the (drive voltage) pattern, when it has not reached the target position (NO at step S45), it means that there is an error in calculation of the amount of movement per driving waveform. Therefore, in the subsequent control for which I=1 (YES at step S47), the voltage value of the drive voltage pattern is set once again (step S48). As a result of the control described above, when it has reached the target position (YES at step S45), if there is no change in the target position (NO at step S52), the positioning is terminated (step S53). When there is a change in the target position (YES at step S52), after the target position is set once again (step S42), the operation from the position detection described above (step S43) is carried out.

Fourth Embodiment

Figure 8:
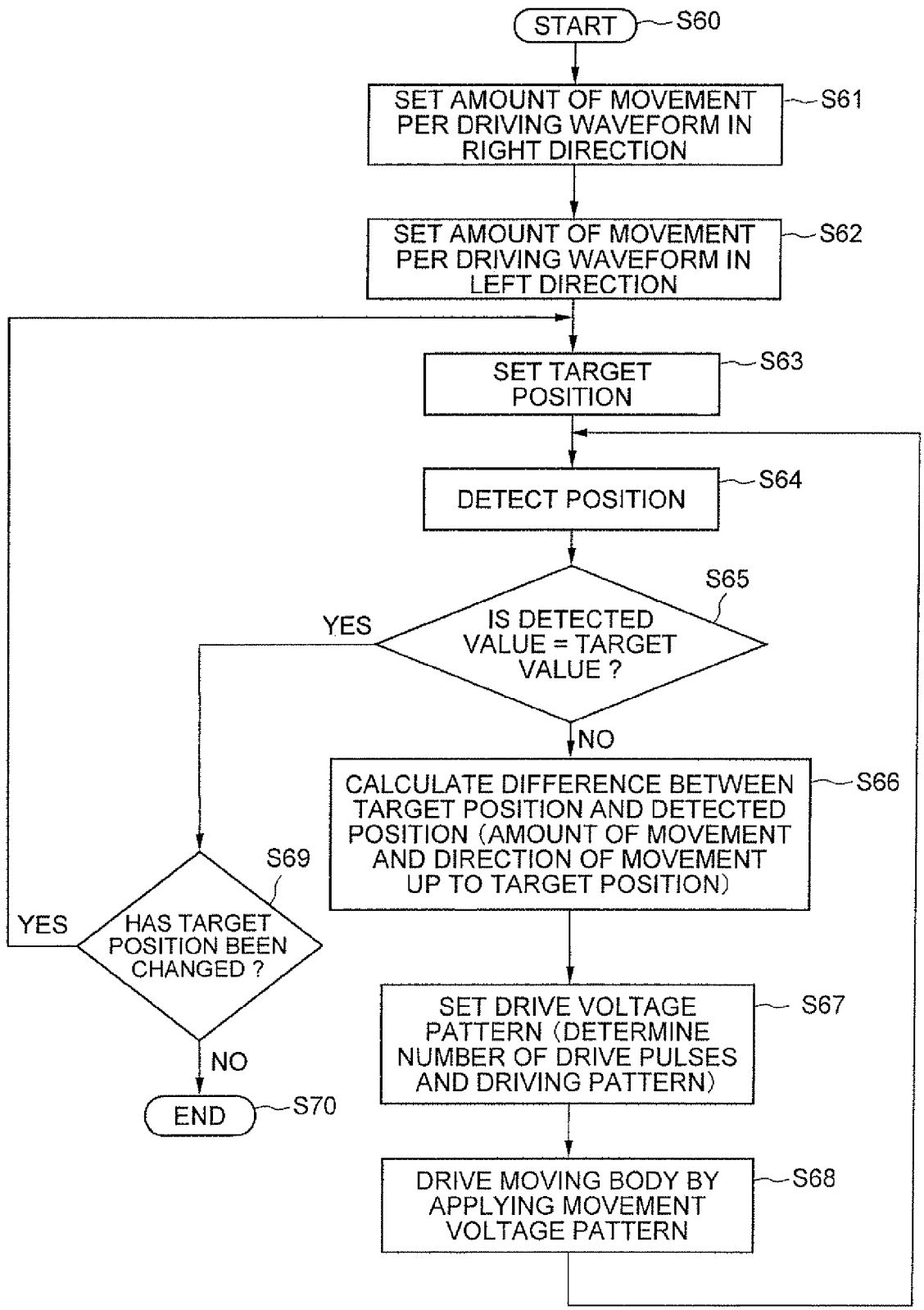
FIG. 8 is a flowchart showing a flow of a position control of an inertial drive actuator according to a fourth embodiment.
Figure 9:
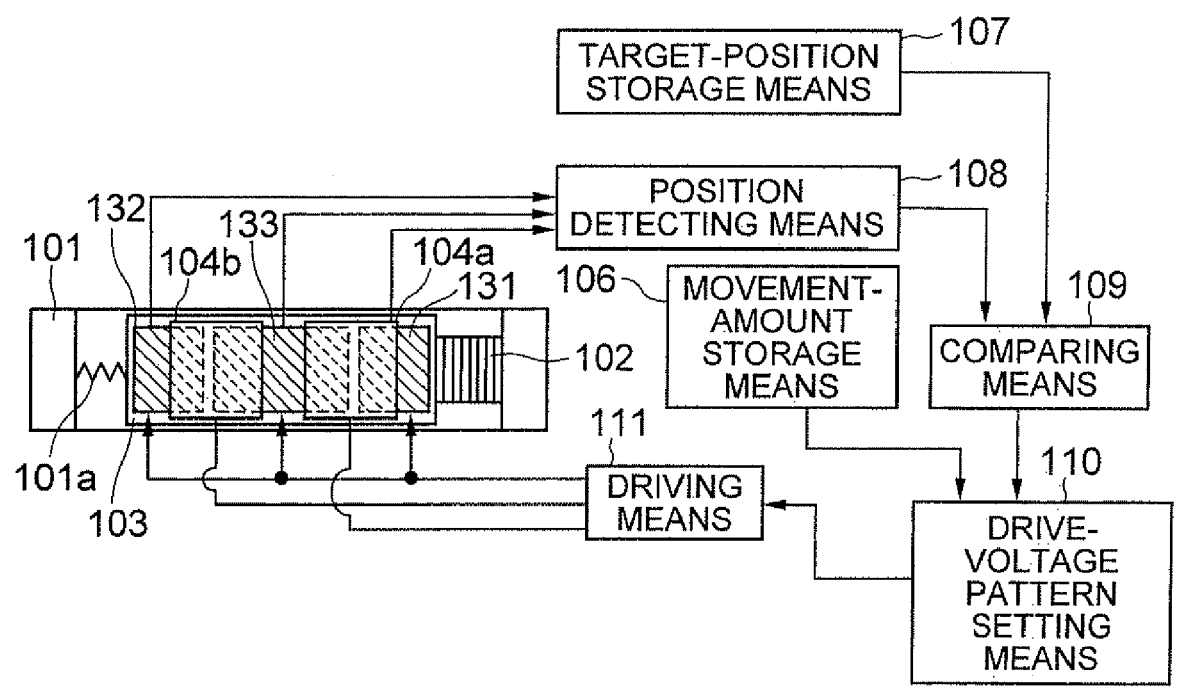
FIG. 9 is a partial plan view showing a structure of an inertial drive actuator according to a fifth embodiment.

FIG. 8 is a flowchart showing a flow of control in a fourth embodiment. As it has hitherto been described, the amount of movement per driving waveform differs according to a situation of friction of the vibration substrate 3 and the moving body 4. This friction can be considered to differ even when the moving body 4 moves to right and when the moving body 4 moves to left. Therefore, in the flowchart of the fourth embodiment, in an inertial drive actuator having a structure same as in the first embodiment to the third embodiment, the amount of movement per driving waveform is obtained separately for the movement of the moving body 4 to right and the movement of the moving body 4 to left. Moreover, at the time of controlling, by using the amount of movement per driving waveform for a movement to right when the moving body 4 moves to right, it is possible to improve further the accuracy of positioning and the response time to the target position. Furthermore, by combining the embodiments from the first embodiment to the fourth embodiment, it is possible to improve further the accuracy of positioning and the response time as it has been described so far. The flow of the control will be described below in detail.

When the control is started (step S60), firstly, when the moving body is to be moved in a right direction, the amount of movement per waveform of the vibration substrate 3 is set from outside or is set by calibration (step S61), and the amount of movement which is set is stored in the movement-amount storage means 6. Next, when the moving body is to be moved in a left direction, the amount of movement per driving waveform of the vibration substrate 3 is set from outside or is set by calibration (step S62), and the amount of movement which is set is stored in the movement-amount storage means 6.

Next, the target position is set by an external device such a PC (not shown in the diagram), and is stored in the target-position storage means 7 (step S63). Next, the current position of the moving body 4 is detected by the positional relationship of the moving body 4, and the electrodes 31 and 32 (step S64). Even in the fourth embodiment, the detection of the electrostatic capacitance is used for the position detection. The position detection being similar as in the first embodiment, the detail description thereof is omitted.

The target position and the detected position are input to the comparing means 9 from the target-position storage means 7 and the position detecting means 8 respectively, and when the difference between the target position and the detected position is not zero (NO at step S65), the difference between the target position and the detected position at the current point of time, in other words, the amount of movement up to the target position and the direction thereof are calculated (step S66).

When the amount of movement up to the target position and the direction thereof are calculated, in the drive-voltage pattern setting means 10, from the amount of movement up to the target position, and the amount of movement per driving waveform which is set in the movement-amount storage means 6, the number of driving waveforms up to the target position are calculated, and also, the drive voltage pattern corresponding to the direction of movement is set (step S67). The drive voltage pattern which is set is applied to the piezoelectric element 2, the moving body 4, and the electrodes 31 and 32, by the driving means 11. Based on the waveform applied, the moving body 4 moves to the target position (step S68). After applying the waveform, the position detection of the moving body 4 is carried out once again (step S64).

After the positioning control is started (step S60), at the first control step, based on the amount of movement per driving waveform which is determined in advance, the drive voltage pattern is applied (step S68). By the position detection (step S64) after applying the drive voltage pattern, when it has not reached the target position (NO at step S65), since it means that there is an error in calculation of the amount of movement per driving waveform, the amount of movement per driving waveform is (to be) set once again (steps S66 and S67). In this manner, by updating the amount of movement per driving wave form according to the situation, it is possible to improve further the accuracy of positioning and the response time to the target position. As a result of the control described above, when it has reached the target position (YES at step S65), if there is no change in the target position (NO at step S69), the positioning is terminated (step S70). When there is a change in the target position (YES at step S69), after the target position is set once again (step S63), the operation after the position detection described above (step S64) is carried out.

Fifth Embodiment

Figure 10:
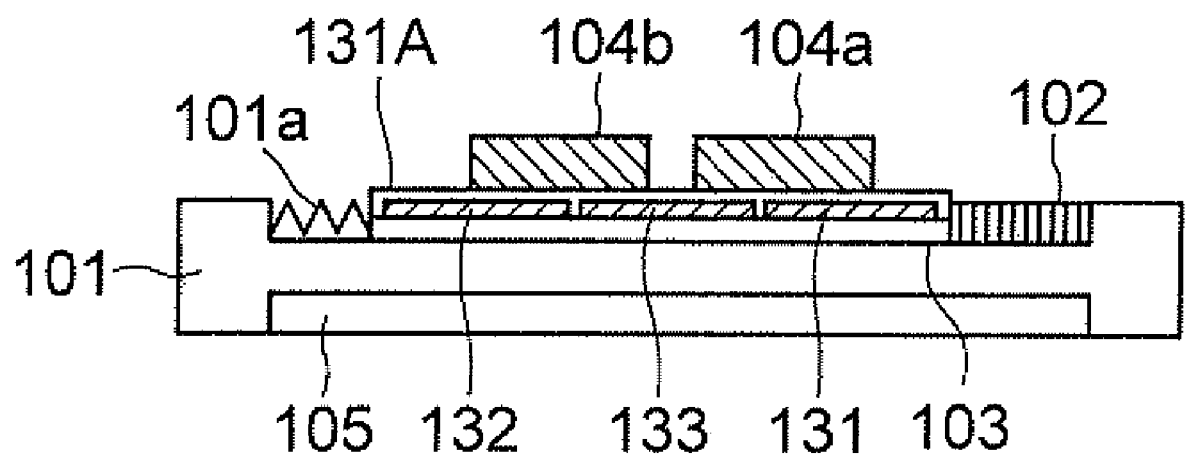
FIG. 10 is a side view (cross-sectional view) showing the structure of the inertial drive actuator according to the fifth embodiment of the present invention.

Next, fifth embodiment of the present invention will be described while referring to FIG. 9 to FIG. 12. FIG. 5 (FIG. 9) shows a plan view and FIG. 10 shows a side view (cross-sectional view). An inertial drive actuator according to the fifth embodiment is an actuator which carries out separately a position control of two moving bodies 104$a$ and 104$b$ disposed on a vibration substrate 103 by using three electrodes 131, 132, and 133. The inertial drive actuator according to the fifth embodiment is capable of controlling independently two or more than two moving bodies only by adding one electrode to the actuator of the embodiments from the first embodiment to the fourth embodiment, by setting separately the drive voltage pattern to the moving body 104$a$ and 104$b$.

In the inertial drive actuator according to the fifth embodiment, similarly as the inertial drive actuator according to the first embodiment, one end of a piezoelectric element (moving means) 102 is fixed to a fix member 101, and the other end thereof is fixed to one end of the vibration substrate 103. One end of a spring 101$a$ is fixed to the other end of the vibration substrate 103, and the other end of the spring 101$a$ is fixed to a side wall of the fix member 101.

On the vibration substrate 103, the electrodes are arranged in order of the electrode 131, the electrode 133, and the electrode 132, from a side of the piezoelectric element 102 to a side of the spring 101a. Moreover, the moving bodies 104a and 104b are disposed on the vibration substrate 103 via an insulating film 131A. When an electric potential difference is imparted between the moving bodies 104a and 104b, and the electrodes 131, 132, and 133, when these electrodes are considered to be the electrodes facing, an electrostatic force acts between the electrodes. On the vibration substrate 103, on a side opposite to a surface where the moving bodies 104a and 104b are disposed, a permanent magnet 105 is disposed to be extended in a direction of vibration of the vibration substrate 103. A magnetic material is used for the moving bodies 104a and 104b, and a magnetic adsorption force acts between the permanent magnet 105 and the moving bodies 104a and 104b. Therefore, even when the voltage applied between the moving bodies 104a and 104b, and the electrodes 131, 132, and 133 is stopped, the moving bodies 104a and 104b are held at those positions due to the permanent magnet 105. The moving body 104a corresponds to a first moving body (=first electrode). The moving body 104b corresponds to a second moving body (=third electrode). Moreover, the electrodes 131, 132, and 133 correspond to second electrode provided on the vibration substrate 103.

A position detecting means 108 is connected to the electrodes 131, 132, and 133, and the position detecting means 108 detects an electrostatic capacitance between the mutually facing moving body 104a and the electrodes 131 and 133, and an electrostatic capacitance between the mutually facing moving body 104b and the electrodes 133 and 132. This detection data is sent to a comparing means 109. A target-position storage means 107 is connected to the comparing means 109, and the comparing means 109 compares data sent from the target-position storage means 107, and data sent from the position detecting means 108. A comparison result is output to a drive-voltage pattern setting means 110. A movement-amount storage means 106 is connected to the drive-voltage pattern setting means 110. An amount of movement of the vibration substrate 103 when driving waveform is applied to the piezoelectric element 102 is stored in the movement-amount storage means 106. In the drive-voltage pattern setting means 110, a drive signal corresponding to the amount of movement stored in the movement-amount storage means 106, and the comparison result in the comparing means 109 are output to a driving means 111. The driving means 111 is connected to the piezoelectric element 102, the electrode 131, the electrode 132, the electrode 133, and the moving bodies 104a and 104b, and imparts a drive signal independently to these elements.

Figure 11A:
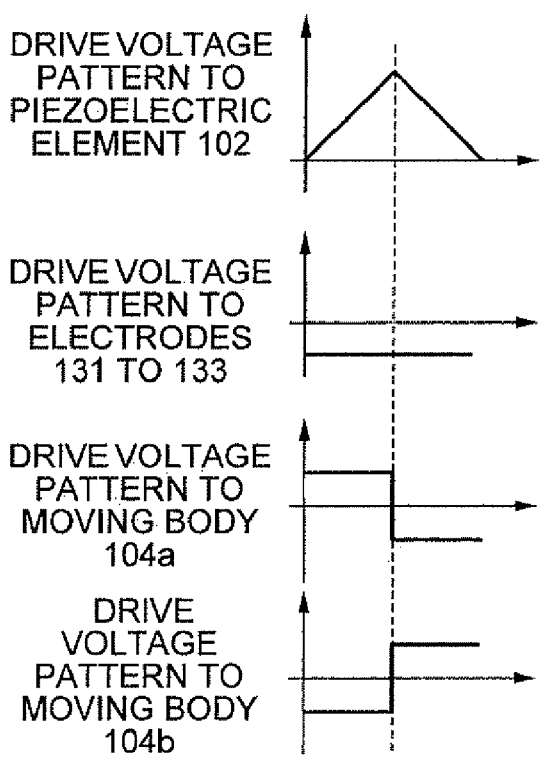
FIG. 11A shows a driving waveform per drive when one moving body is moved in the right direction and the other moving body is moved in the left direction, in the inertial drive actuator according to the fifth embodiment, with a horizontal axis showing time and a vertical axis showing a size of a signal.
Figure 11B:
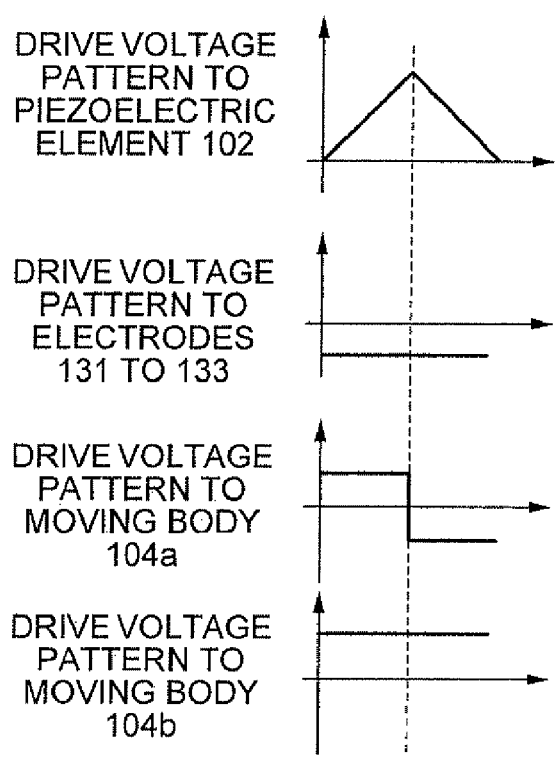
FIG. 11B shows a driving waveform per drive when one moving body is moved in the right direction, and the other moving body is stopped, in the inertial drive actuator according to the fifth embodiment, with a horizontal axis showing time and a vertical axis showing size of a signal.

FIG. 11A and FIG. 11B are examples of a driving waveform of the inertial drive actuator according to the fifth embodiment. FIG. 11A shows a drive voltage pattern for moving the moving body 104a to left and moving body 104b to right. FIG. 11B shows a drive voltage pattern for moving the moving body 104a to right, and stopping the moving body 104b.

As shown in FIG. 11A, when a rising waveform is applied to the piezoelectric element 102, a voltage of waveform such that the moving body 104a and the electrodes 131, 132, and 133 on and the vibration substrate 103 are let to be adsorbed and the moving body 104b is not let to be adsorbed, is applied to each of the moving bodies 104a and 104b. Whereas, when a falling waveform is applied to the piezoelectric element 102, a voltage of waveform such that the moving body is not let to be adsorbed, and the moving body 104b is let to be adsorbed, is applied to each of the moving bodies 104a and 104b. When such an arrangement is made, the moving body 104a is moved to left and the moving body 104b is moved to right. Whereas, as in FIG. 11B, when a voltage such that the electrodes 131, 132, and 133 are adsorbed all the time, is applied to the moving body 104b, the moving body 104b does not move, and only the moving body 104a moves.

Figure 12:
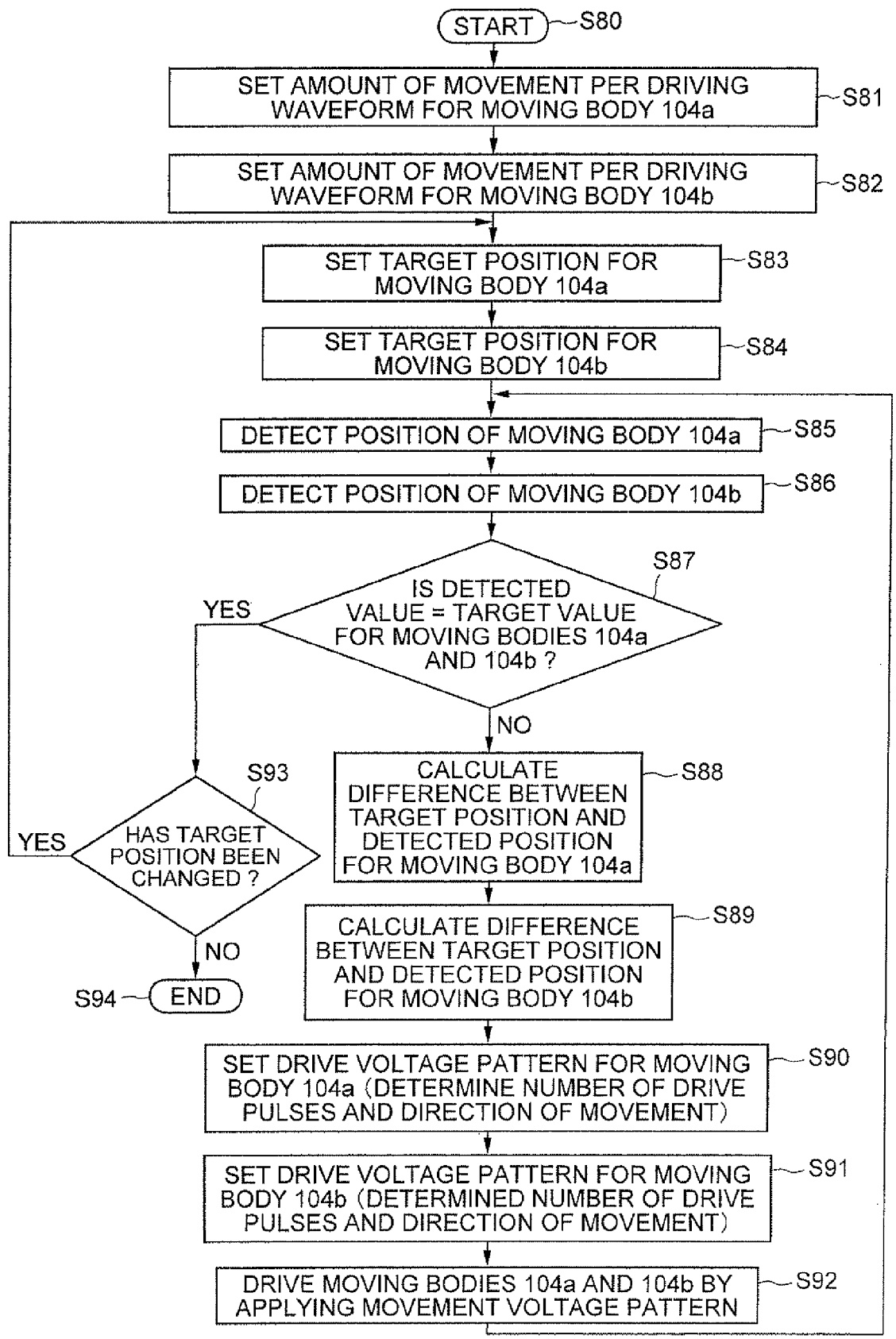
FIG. 12 is a flow chart showing a flow of a position control of the inertial drive actuator according to the fifth embodiment.
Figure 13:
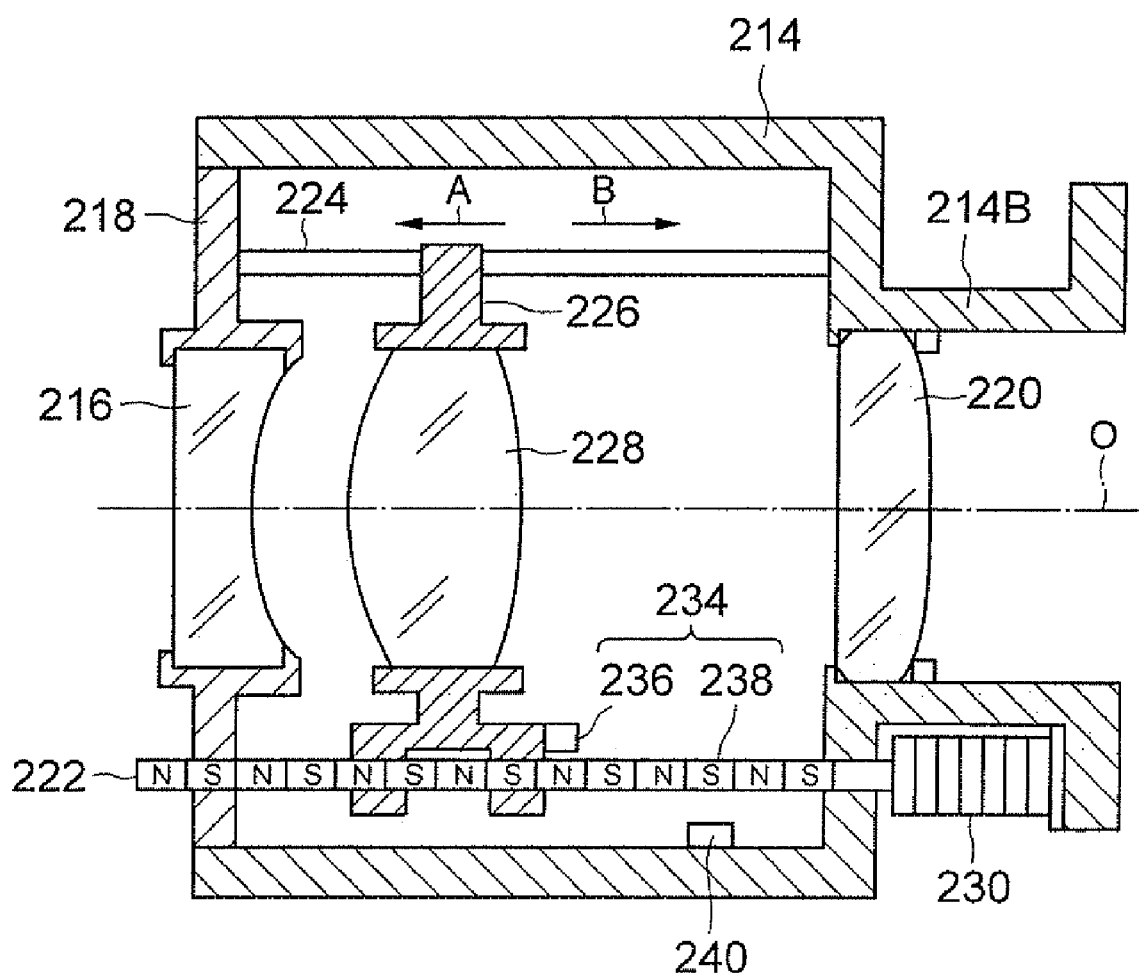
FIG. 13 is a cross-sectional view showing a schematic structure of a lens unit according to a conventional displacement-amount detection method.

FIG. 12 is a flowchart showing a flow of control in the inertial drive actuator according to the fifth embodiment. This flowchart is also applicable to a case other than the fifth embodiment provided that it is a case of positioning each of two or more than two moving bodies. Similarly as positioning one moving body as in the embodiments from the first embodiment to the fourth embodiment, even in the fifth embodiment in which there are two moving bodies, an amount of movement per driving waveform is set for the two moving bodies (steps S81 and S82). A target position is set for each of the moving bodies 104a and 104b (steps S83 and S84). Position detection (steps S85 and S86), detection of difference between the detected position and the target position (steps S88 and S89), creating drive voltage pattern (steps S90 and S91), and applying the drive pattern (steps S92) are carried out for each moving body.

Furthermore, when the target position and the position detected after applying the drive voltage pattern coincide (YES at step S87), if there is no change in the target position (NO at step S93), the positioning is terminated (step S94). When there is a change in the target position (YES at step S93), operation after the position detection described above (step S85) is carried out after the target position is set again (steps S83 and S84). The flow of control being similar to the case (FIG. 3) in the first embodiment, detail description is omitted.

By such control, the positioning is possible for two or more moving objects, similarly as in a case of one moving body. Regarding the setting of the target position, each moving body may be input at relative position with respect to the vibration substrate, or it may be a method of input of a target position such that a distance between the moving body 104a and the moving body 104b becomes a predetermined distance. Moreover, regarding positioning of two or more than two moving bodies, it is easily possible to use a setting of the amount of movement per driving waveform as in the embodiments from the second embodiment to the fourth embodiment.

As it has been described above, a position control method of inertial drive actuator and an inertial drive actuator according to the present invention are useful for a minute (micro) displacement of a small-size moving body, and particularly, is appropriate for a position control of an optical system of a camera for a mobile telephone and an endoscope.

The position control method of inertial drive actuator according to the present invention shows an effect that it is possible to dispose a moving body to a target position accurately and promptly.

What is claimed is:

1. A position control method of inertial drive actuator which is a method of driving a moving body by inertia, with respect to a vibration substrate which is caused to make reciprocating movement by a moving means, comprising:
   a movement-amount setting step of setting an amount of movement per driving waveform;
   a target-position setting step of setting a target position of the moving body;
   a position detection step of detecting a relative position of the moving body with respect to the vibration substrate, based on an electrostatic capacitance of a portion at which, a first electrode provided on the moving body and a second electrode provided on the vibration plate are facing;

a comparison step of comparing the target position which is set at the target-position setting step, and the relative position of the moving body with respect to the vibration substrate, which is detected at the position detection step;

a drive-voltage pattern setting step of setting a drive voltage pattern which is to be applied to the moving means, the first electrode, and the second electrode, based on the amount of movement set at the movement-amount setting step and a comparison result at the comparison step; and a driving step of driving the moving body by controlling a frictional force between the vibration substrate and the moving body, by making an electrostatic force act on both, while synchronizing with a movement of the vibration substrate, by applying the drive voltage pattern which is set at the drive-voltage pattern setting step, between the first electrode and the second electrode, wherein the moving body is moved to the target position by repeating steps from the comparison step to the driving step.

2. The position control method of inertial drive actuator according to claim 1, wherein the amount of movement per driving waveform is set from a predetermined number of drive voltage patterns applied to the moving means, and the first electrode and the second electrode from a predetermined position of the moving body, and an amount of movement from a predetermined position after the moving body is moved.

3. The position control method of inertial drive actuator according to claim 1, wherein data of the amount of movement per driving waveform of the moving body, which is measured at a time of simulation and assembling is set.

4. The position control method of inertial drive actuator according to claim 1, wherein the amount of movement per driving waveform is set for two directions namely, a predetermined direction of movement of the moving body, and a direction opposite to the predetermined direction of movement of the moving body.

5. The position control method of inertial drive actuator according to claim 1, wherein the amount of movement per driving waveform is set once again based on a relationship between the drive voltage pattern which is output at the driving step, and the position which is detected by the position detection, when the process is shifted from the driving step to the position detection step.

6. The position control method of inertial drive actuator according to claim 1, wherein after an end of the driving step, once again, at the time of setting the drive voltage pattern, a voltage value of the drive voltage pattern to be applied is changed based on a result at the position detection step and the comparison step.

7. The position control method of inertial drive actuator according to claim 1, wherein the moving body is made of an electroconductive material, and the moving body functions as the first electrode.

8. A position control method of inertial drive actuator which is a method of driving a first moving body and a second moving body by inertia, with respect to a vibration substrate which is caused to make reciprocating movement by a moving means, comprising:

a movement-amount setting step of setting an amount of movement per driving waveform;

a target-position setting step of setting a first target position and a second target position of the first moving body and the second moving body;

a position detection step of detecting relative positions of the first moving body and the second moving body with respect to the vibration substrate, based on an electrostatic capacitance of a portion at which, a first electrode and a third electrode provided on the first moving body and the second moving body respectively, and a second electrode provided on the vibration substrate are facing;

a comparison step of comparing the target position which is set at the target-position setting step and the relative positions of the first moving body and the second moving body with respect to the vibration substrate, which are detected at the position detection step;

a drive-voltage pattern setting step of setting a drive voltage pattern which is to be applied to the moving means, the first electrode, and the second electrode, based on the amount of movement set at the movement-amount setting step and a comparison result at the comparison step; and a driving step of driving the moving body by controlling a frictional force which is developed between the vibration substrate, and the first moving body and the second moving body, by making an electrostatic force act on both, while synchronizing with a movement of the vibration substrate, by applying a drive voltage pattern which is set at the drive-voltage pattern setting step between the first electrode and the second electrode, and the third electrode, wherein the first moving body and the second moving body are moved to the target position by repeating steps from the comparison step to the driving step.

9. The position control method of inertial drive actuator according to claim 8, wherein the target position which is set at the target-position setting step is set by relative positions of the first moving body and the second moving body, and the vibration substrate.

10. The position control method of inertial drive actuator according to claim 8, wherein the target position which is set at the target-position setting step is set by letting a distance between the first moving body and the second moving body as the target position.

11. The position control method of inertial drive actuator according to claim 8, wherein the amount of movement per driving waveform of the moving body is set for each of the first moving body and the second moving body.

12. The position control method of inertial drive actuator according to claim 8, wherein the amount of movement per driving waveform is set for two directions namely, a predetermined direction of movement of the moving body, and a direction opposite to the predetermined direction of movement of the moving body.

13. The position control method of inertial drive actuator according to claim 11, wherein the amount of movement per driving waveform to be set for the first moving body and the second moving body is set for two directions namely, a predetermined direction of movement of the moving body, and a direction opposite to the predetermined direction of movement of the moving body.

14. The position control method of inertial drive actuator according to claim 8, wherein the first moving body and the second moving body are made of an electroconductive material, and the first moving body and the second moving body function as the first electrode and the second electrode respectively.

15. An inertial drive actuator which drives a moving body by inertia, with respect to a vibration substrate, which is caused to make reciprocating movement by a moving means, comprising:
- a movement-amount storage means, which stores an amount of movement per driving waveform;
- a target-position storage means, which stores a target position of the moving body;
- a position detecting means, which detects a relative position of the moving body with respect to the vibration substrate, based on an electrostatic capacitance of a portion at which, a first electrode provided on the moving body and a second electrode provided on the vibration substrate are facing;
- a comparing means, which compares the target position stored in the target-position storage means, and a relative position of the moving body with respect to the vibration substrate, which is detected by the position detecting means;
- a drive-voltage pattern setting means, which sets a drive voltage pattern which is to be applied to the moving means, the first electrode, and the second electrode, based on the amount of movement stored in the movement-amount storage means, and an output of a comparison result which is output; and
- a driving means, which drives the moving body by controlling a frictional force between the vibration substrate and the moving body, by making an electrostatic force act on both, while synchronizing with a movement of the vibration substrate, by applying a drive voltage pattern which is set at (by) the drive-voltage pattern setting means, between the first electrode and the second electrode.

16. The inertial drive actuator according to claim 15, wherein the amount of movement stored in the movement-amount storage means is an amount of movement which is set from a predetermined number of drive voltage patterns applied to the moving means, and the first electrode and the second electrode from a predetermined position after the moving body is moved.

17. The inertial drive actuator according to claim 15, wherein data of the amount of movement per driving waveform of the moving body, which is measured at a time of simulation and assembling is set.

18. The inertial drive actuator according to claim 15, wherein the amount of movement per driving waveform stored in the movement-amount storage means is set for two directions namely, a predetermined direction of movement of the moving body, and a direction opposite to the predetermined direction of movement of the moving body.

19. The inertial drive actuator according to claim 15, wherein
the moving body is made of an electroconductive material, and
the moving body functions as the first electrode.

20. An inertial drive actuator which drives a first moving body and a second moving body by inertia, with respect to a vibration substrate which is caused to make reciprocating movement by a moving means, comprising:
- a movement-amount storage means which stores an amount of movement per driving waveform;
- a target-position storage means, which stores a target position of the first moving body and the second moving body;
- a position detecting means which detects relative positions of the first moving body and the second moving body with respect to the vibration substrate, based on an electrostatic capacitance of a portion at which, a first electrode and a third electrode provided on the first moving body and the second moving body, and a second electrode provided on the vibration substrate are facing;
- a comparing means which compares the target position stored in the target-position storage means and relative positions of the first moving body and the second moving body detected by the position detecting means;
- a drive-voltage pattern setting means which sets a drive voltage pattern which is to be applied to the moving means, the first electrode, and the second electrode, based on the amount of movement stored in the movement-amount storage means, and an output of the comparing means; and
- a driving means which drives the moving body by controlling a frictional force between the vibration substrate and the moving body, by making a force act on both while synchronizing with a movement of the vibration substrate, by applying a drive voltage pattern which is set at the drive-voltage pattern setting means, between the first electrode and the second electrode, and the third electrode.

21. The inertial drive actuator according to claim 20, wherein the target positions stored in the target-position storage means are relative positions of the first moving body and the second moving body, and the vibration substrate.

22. The inertial drive actuator according to claim 20, wherein the target position stored in the target-position storage means is set as a distance between the first moving body and the second moving body.

23. The inertial drive actuator according to claim 20, wherein the amount of movement per driving waveform of the moving body is set for each of the first moving body and the second moving body.

24. The inertial drive actuator according to claim 20, wherein the amount of movement per driving waveform is set for two directions namely, a predetermined direction of movement of the moving body, and a direction opposite to the predetermined direction of movement of the moving body.

25. The inertial drive actuator according to claim 23, wherein the amount of movement per driving waveform to be set for the first moving body and the second moving body is set for two directions namely, a predetermined direction of movement of the moving body, and a direction opposite to the predetermined direction of movement of the moving body.

26. The inertial drive actuator according to claim 20, wherein
the first moving body and the second moving body are made of an electroconductive material, and
the first moving body and the second moving body function as the first electrode and the third electrode respectively.

27. The inertial drive actuator according to claim 20, wherein the amount of movement stored in the movement-amount storage means is an amount of movement which is set from a predetermined number of drive voltage patterns applied to the moving means, and the first electrode, the second electrode, and the third electrode from a predetermined position after the moving body is moved.

28. The inertial drive actuator according to claim 20, wherein data of the amount of movement per driving waveform of the moving body, which is measured at a time of simulation and assembling, is set.

* * * * *